Figure 1:
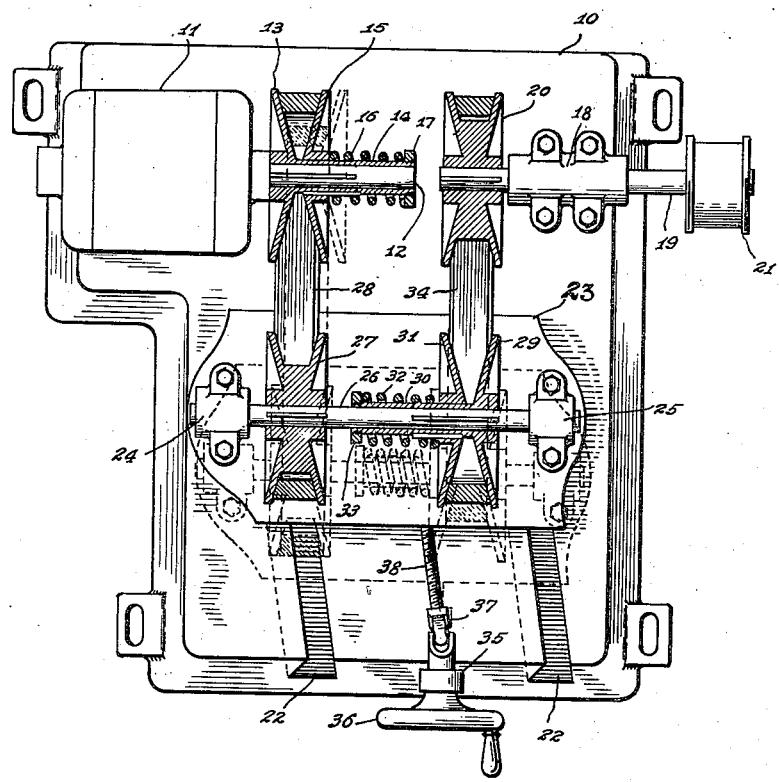

Nov. 7, 1939.    P. B. REEVES    2,179,053

HIGH-RATIO VARIABLE SPEED TRANSMISSION

Filed Nov. 30, 1936

INVENTOR.

BY PAUL B. REEVES,

Hood & Hahn.
ATTORNEYS.

Patented Nov. 7, 1939

2,179,053

UNITED STATES PATENT OFFICE 2,179,053

HIGH-RATIO VARIABLE SPEED TRANSMISSION

Paul B. Reeves, Columbus, Ind., assignor to Reeves Pulley Company, Columbus, Ind., a corporation of Indiana Application November 30, 1936, Serial No. 113,318

6 Claims. (Cl. 74—230.17)

The present application relates to a variable speed drive of the incremental type. The primary object of the invention is to provide a drive generally of the character of that disclosed in my prior Patent No. 1,941,417, but providing for a much greater speed ratio between the input and output shafts. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Figure 2:
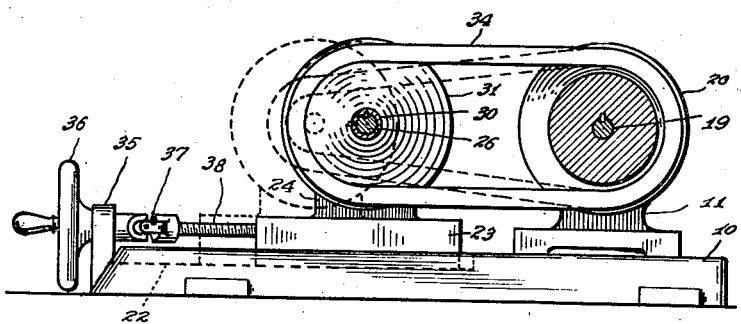

Fig. 1 is a plan view of a drive constructed in accordance with the present invention, parts thereof being shown in section; and Fig. 2 is a side elevation of the organization, the upper portion thereof being a section taken in the median plane of the belt associated with the output shaft.

Referring more particularly to the drawing, it will be seen that I have illustrated an organization comprising a base 10 upon which is suitably mounted a motor 11 having the usual spindle 12. Fixed to the spindle 12 is a coned disc 13 from the coned face of which projects an elongated hub 14. Splined on the hub 14, and axially slidable thereon, is a mating disc 15 cooperating with the disc 13 to form an expansible V-pulley. A spring 16 is compressed between the disc 15 and a stop collar 17 preferably threadedly mounted on the outer end of the hub 14.

Carried at the upper end of an upstanding support (not shown) on base 10 is a bearing 18 in which is journalled an output shaft 19. In the illustrated embodiment of the invention, this shaft is aligned with the motor spindle 12; but it will be obvious that such alignment is in nowise essential.

At its inner end, the shaft 19 carries a fixed diameter V-pulley 20; and at its outer end, said shaft preferably carries a pulley or sheave 21.

The base 10 is provided with a pair of parallel guide slots 22 in which are slidably received feet (not shown) of a carriage 23. Upstanding posts on the carriage 23 support bearings 24 and 25 in which is journalled a countershaft 26. A fixed diameter V-pulley 27 is fixed on said shaft 26; and a V-belt 28 travels over said pulley 27 and the resiliently expansible pulley formed by the discs 13 and 15, providing a driving connection between said pulleys.

A coned disc 29 is fixed to the shaft 26, said disc being formed with an elongated hub 30 projecting from the coned face thereof. A mating coned disc 31 is splined on said hub 30 and is axially slidable thereon, being constantly urged toward the disc 29 by a spring 32 compressed between said disc 31 and a stop collar 33 suitably secured to the end of the hub 30. A V-belt 34 provides a driving connection between the expansible pulley formed by the discs 29 and 31 and the fixed diameter pulley 20.

Journalled in a suitable bearing 35 mounted on the base 10 is a hand-wheel 36 which is connected, through a universal joint 37, to rotate a screw shaft 39 threadedly received in an internally threaded lug (not shown) on the bottom of the carriage 23, so that rotation of the handwheel 36 in one direction or the other will cause movement in one direction or the other of the carriage 23, guided by the slots 22.

It will be obvious that, as the carriage 23 moves away from the axes of the spindle 12 and the shaft 19, thus increasing the center distances between said spindle and shaft on the one hand and the shaft 26 on the other hand, the belt 28 will be crowded more deeply into the groove between the discs 13 and 15, thereby forcing the disc 15 to move toward the right against the opposition of spring 16; and the belt 34 will be crowded more deeply into the groove between the discs 29 and 31, thereby forcing the disc 31 to move toward the left against the tendency of the spring 32. If this carriage movement were in a line perpendicular to the axes of the spindle 12 and the shaft 19, it will be obvious that the belts 28 and 34 would be thrown out of alignment; since, as the belt 28 is crowded into the groove between the discs 13 and 15, it must move toward the right in following the contour of the fixed disc 13; and since the belt 34 must similarly move toward the left in following the contour of the disc 29. In order to prevent such misalignment, it will be obvious that the pulley 27 must be moved toward the right, during movement of the shaft 26 away from the spindle 12 and shaft 19, a distance equal to the lateral degree of movement of the belt 28 in following the contour of the disc 13. In my above-mentioned prior Patent No. 1,941,417, I have explained the manner of calculating the proper angle of movement of the pulley 27; and the slots 22 are so formed in the base 10 as to enforce that proper degree of lateral movement of the carriage 23 which will force the pulley 27 to move in accordance with the disclosure of my above identified patent.

It will be clear that, if the belt 34 is likewise to be kept in alignment, and if the pulley 27 and the discs 29 and 31 are to be mounted on a common shaft, the pulley 27 and disc 29 being fixed to said shaft, it is essential that the pitch of the coned face of the disc 29 shall be identical with the pitch of the coned face of the disc 31; and that said disc 29 shall face in a direction opposite to the direction in which the disc 31 faces.

When these conditions are observed, the movement of the shaft 26 will be such that, as the belt 34 is crowded more deeply into the groove between the discs 29 and 31, the disc 29 will move toward the right to a degree just sufficient to prevent lateral movement of the belt 34.

It will be obvious that the hand-wheel 36 might be mounted in a bearing so positioned as to align the axis of said hand-wheel with the axis of the screw shaft 38, in which case it would be possible to dispense with the universal joint 37. For commercial reasons, however, I prefer to mount the hand-wheel 36 on an axis perpendicular to the vertical plane including the transverse edge of the base 10; and thus the use of the universal joint 37 is made necessary.

It will be quite obvious that, if desired, the entire organization (or any desired parts thereof) may be enclosed in a suitable housing.

I claim as my invention:

1. In a device of the class described, a base, a motor mounted on said base and having a spindle, a pulley mounted on said spindle, an output shaft mounted on said base, a pulley on said output shaft, a carriage slidably mounted on said base for linear movement toward and away from said motor and output shaft, said motor and output shaft being positioned on the same side of said carriage, a shaft carried by said carriage, two pulleys mounted on said last-named shaft, a V-belt travelling over said motor-spindle pulley and one of said last-named pulleys, a V-belt travelling over said output-shaft pulley and the other of said last-named pulleys, one of the pulleys associated with each belt being expansible, and means for shifting said carriage on said base.

2. In a device of the class described, a base, a motor mounted on said base and having a spindle, a resiliently expansible pulley mounted on said spindle, an output shaft mounted on said base, a pulley on said output shaft, a carriage slidably mounted on said base for linear movement toward and away from said motor and output shaft, said motor and output shaft being positioned on the same side of said carriage, a shaft carried by said carriage, a third pulley mounted on said last-named shaft, a V-belt travelling over said first-named pulley and said third pulley, a second resiliently expansible pulley mounted on said last-named shaft, a second V-belt travelling over said second expansible pulley and said output-shaft pulley, and means for shifting said carriage on said base.

3. In a device of the class described, a base, a motor mounted on said base and having a spindle, a resiliently expansible pulley mounted on said spindle, an output shaft mounted on said base, a pulley on said output shaft, a carriage slidably mounted on said base for linear movement toward and away from said motor and output shaft, said motor and output shaft being positioned on the same side of said carriage, a shaft carried by said carriage, a third pulley mounted on said last-named shaft, a V-belt travelling over said first-named pulley and said third pulley, a second resiliently expansible pulley mounted on said last-named shaft, a second V-belt travelling over said second expansible pulley and said output-shaft pulley, and means for shifting said carriage on said base, while maintaining alignment of said respective belts.

4. In a device of the class described, a base, a motor mounted on said base and having a spindle, a resiliently expansible pulley mounted on said spindle and comprising a coned disc fixed to said spindle, a mating coned disc, and means resiliently urging said mating disc toward said fixed disc, an output shaft on said base, a fixed-diameter V-pulley mounted on said output shaft, a carriage, a shaft carried by said carriage, a fixed-diameter V-pulley mounted on said last-named shaft, a V-belt travelling over said expansible pulley and said last-named fixed diameter pulley, a second resiliently expansible pulley mounted on said last-named shaft and comprising a coned disc fixed to said shaft, a mating coned disc, and means resiliently urging said mating disc toward said fixed disc, the fixed discs of said two expansible pulleys facing in opposite directions, a second V-belt traveling over said last-named expansible pulley and said first-named fixed diameter pulley, and means for shifting said carriage toward and away from said motor and output shaft, said base being formed with means cooperating with said carriage and guiding the same during the shifting thereof to enforce movement of said carriage in a direction parallel to the axis of the shaft thereon to maintain alignment of said belts.

5. In a device of the class described, a base, a motor mounted on said base and having a spindle, a resiliently expansible pulley mounted on said spindle and comprising a coned disc fixed to said spindle, a mating coned disc, and means resiliently urging said mating disc toward said fixed disc, an output shaft on said base, a fixed-diameter V-pulley mounted on said output shaft, a countershaft, a fixed-diameter V-pulley mounted on said countershaft, a V-belt travelling over said expansible pulley and said last-named fixed diameter pulley, a second resiliently expansible pulley mounted on said countershaft and comprising a coned disc fixed to said countershaft, a mating coned disc, and means resiliently urging said mating disc toward said fixed disc, the fixed discs of said two expansible pulleys facing in opposite directions, a V-belt traveling over said last-named expansible pulley and said first-named fixed diameter pulley, means for shifting said countershaft linearly toward and away from said motor and output shaft, and means operable upon such shifting of said countershaft to move said last-named fixed diameter pulley in a direction parallel to the axis of the motor spindle to a degree equal to the lateral movement of said first-mentioned belt consequent upon movement thereof over the face of said first-mentioned fixed disc, and to move said last-named expansible pulley in a like direction to a degree sufficient to prevent lateral movement of said last-named belt consequent upon movement thereof over the face of said last-named fixed disc.

6. In a device of the class described, a base formed to provide a guideway, a motor mounted on said base and having a spindle, a resiliently expansible pulley mounted on said spindle and comprising a coned disc fixed to said spindle, a mating coned disc, and means resiliently urging said mating disc toward said fixed disc, an output shaft on said base, a fixed-diameter V-pulley mounted on said output shaft, a carriage, a shaft carried by said carriage, a fixed-diameter V-pulley mounted on said last-named shaft, a V-belt travelling over said expansible pulley and said last-named fixed diameter pulley, a second resiliently expansible pulley mounted on said last-named shaft and comprising a coned disc fixed to said shaft, a mating coned disc, and means resiliently urging said mating disc toward said fixed disc, the fixed discs of said two expansible pulleys being of identical pitch and facing in opposite directions, a second V-belt traveling over said last-named expansible pulley and said first-named fixed diameter pulley, and means for shifting said carriage toward and away from said motor and output shaft, said guideway cooperating with said carriage and guiding the same during shifting thereof to enforce movement of said carriage in a direction parallel to the axis of the shaft thereon to a degree equal to the lateral movement of said first mentioned belt consequent upon movement thereof over the face of said first-mentioned fixed disc.

PAUL B. REEVES.